United States Patent [19]

Kitora

[11] Patent Number: 4,982,414
[45] Date of Patent: Jan. 1, 1991

[54] ABBREVIATED INCREMENTER CIRCUIT

[75] Inventor: Yoshitsugu Kitora, Ideda, Japan

[73] Assignee: Ricoh Company, Ltd., Tokyo, Japan

[21] Appl. No.: 287,450

[22] Filed: Dec. 20, 1988

[30] Foreign Application Priority Data

Dec. 21, 1987 [JP] Japan .............................. 62-324807
Jan. 28, 1988 [JP] Japan .................................. 63-18331

[51] Int. Cl.⁵ ...................... H03K 21/16; H03K 21/10
[52] U.S. Cl. ...................................... 377/51; 377/116; 377/117
[58] Field of Search ................... 377/115, 116, 81, 51, 377/117

[56] References Cited

U.S. PATENT DOCUMENTS

| | | | |
|---|---|---|---|
| 3,631,350 | 12/1971 | Drake | 377/116 |
| 3,753,127 | 8/1973 | Rowe | 377/116 |
| 4,400,615 | 8/1983 | Asami et al. | 377/51 |
| 4,493,095 | 1/1985 | Yazawa | 377/115 |
| 4,611,337 | 9/1986 | Evans | 377/116 |
| 4,630,295 | 12/1986 | Kamuro et al. | 377/81 |
| 4,759,043 | 7/1988 | Lewis | 377/116 |
| 4,780,894 | 10/1988 | Watkins et al. | 377/51 |

Primary Examiner—John S. Heyman
Attorney, Agent, or Firm—Cooper & Dunham

[57] ABSTRACT

An incrementer circuit includes a plurality of input terminals for receiving an address data, having a plurality of bits, to be incremented, a carry signal generating unit for generating a carry signal for each bit of the address data and a plurality of output terminals where an incremented address data appears. The carry signal generating unit includes a detector for detecting whether or not all of a predetermined number of less significant bits of the address data are at high level and outputs a detection signal if so. In response to this detection signal, a carry signal is generated and supplied to a bit which is more significant than the most significant bit of the predetermined number of less significant bits by one bit.

6 Claims, 4 Drawing Sheets

ABBREVIATED INCREMENTER CIRCUIT

BACKGROUND OF THE INVENTION

1. Field of the Invention

This invention generally relates to an incrementer circuit for use in a semiconductor device, and, in particular, to an incrementer circuit, for example, for use in a microprogram controller.

2. Description of the Prior Art

A microprogram controller for use in a microcomputer or the like is disclosed in Japanese Patent Laid-open Publication No. 62-216229. The microprogram controller disclosed in this publication includes an incrementer circuit which outputs an input address data by adding 1 thereto if a Hi level carry in signal is input; whereas, the address data is output without alteration if a Hi level carry in signal is not input.

Figure 2:
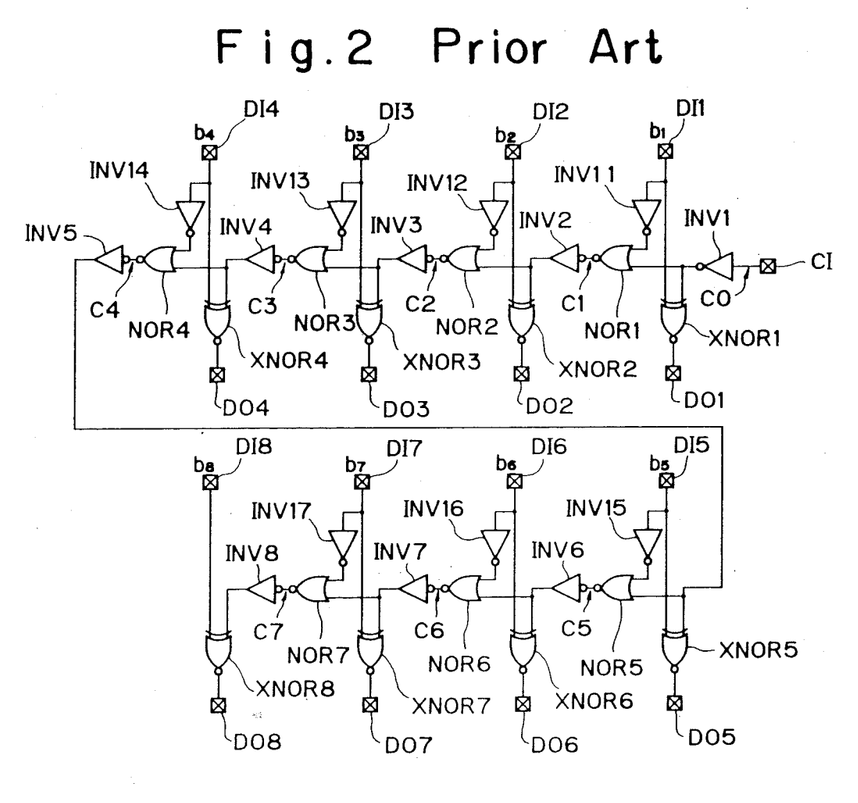
FIG. 2 is a schematic illustration showing a typical prior art incrementer circuit.

FIG. 2 schematically illustrates a typical prior art incrementer circuit for processing an 8-bit address data. In FIG. 2, the respective bits b1 through b8 of an 8-bit address data are supplied to respective second input terminals of exclusive NOR gates XNOR1 through XNOR8 via respective data input terminals DI1 through DI8. The respective bits b1 through b7 of the address data input to the data input terminals DI1 through DI7 are also input into respective first input terminals of NOR gates NOR1 through NOR7 via respective inverters INV11 through INV17. A carry in signal is applied in the form of a carry signal C0 to the second input terminal of the NOR gate NOR1 and also to the first input terminal of the exclusive NOR gate XNOR1 via an input terminal CI and an inverter INV1.

If a Hi level carry in signal has been input and the bit b1 is at Hi level, then the NOR gate NOR1 outputs a Hi level carry signal C1 to the second input terminal of the NOR gate NOR2 and also to the first input terminal of the exclusive NOR gate XNOR2 via an inverter INV2. If the carry signal C1 is at Hi level and the bit b2 is also at Hi level, then the NOR gate NOR2 outputs a Hi level carry signal C2 to the second input terminal of the NOR gate NOR3 and also to the first input terminal of the exclusive NOR gate XNOR3 via an inverter INV3. Similarly, if each of carry signals C2 through C5 is at Hi level and the corresponding one of the bits b3 through b6 is at Hi level, then each of the NOR gates NOR3 through NOR6 outputs a corresponding one of Hi level carry signals C3 through C6 to the second input terminal of a corresponding one of the NOR gates NOR4 through NOR7 and also to the first input terminal of a corresponding one of the exclusive NOR gates XNOR4 through XNOR7 via a corresponding one of inverters INV4 through INV7. In addition, if the carry signal C6 is at Hi level and the bit b7 is at Hi level, then the NOR gate NOR7 outputs a Hi level carry signal C7 to the first input terminal of the exclusive NOR gate XNOR8 via an inverter INV8.

As a result, if a Hi level carry in signal is input, the exclusive NOR gates XNOR1 through XNOR8 increment the address data input into the data input terminals DI1 through DI8 by "1", respectively, and output its result to the data output terminals DO1 through DO8. Thus, with the incrementer circuit having the above-described structure, when a Hi level carry in signal has been input into the input terminal CI, an 8-bit address data b1 through b8 input into the data input terminals DI1 through DI8 is incremented by "1" and output to the data output terminals DO1 through DO8. On the other hand, if a Lo level carry in signal has been input into the input terminal CI, an 8-bit address data b1 through b8 input into the data input terminals DI1 through DI8 is output to the data output terminals DO1 through DO8 without alteration.

In an incrementer circuit as described above, carry signals C1 through C7 are sequentially generated by the NOR gates NOR1 through NOR7 one after another so that it takes a relatively long period of time from the time when an address data has been input to the time when the most significant bit carry signal C7 is produced to obtain an incremented address data.

SUMMARY OF THE INVENTION

In accordance with one aspect of the present invention, there is provided an incrementer circuit capable of providing an incremented address data in response to an input address data. That is, there is provided an incrementer circuit which includes a plurality of generating means for generating carry signals indicating whether or not a carry is to be implemented for each of the bits of input data sequentially from the lowest significant bit to the most significant bit in response to the input data having a plurality of bits and which outputs the input data after incrementing by "1." In this aspect of the present invention, the incrementer circuit includes a detecting means for detecting whether or not all of a predetermined number of lower significant bits among the input data are at Hi level to output a detection signal if all of these bits are, in fact, at Hi level. The incrementer circuit also includes a signal outputting means for outputting a carry signal to that generating means which is more significant than the highest bit of the predetermined number of lower significant bits by one bit in response to the detection signal output from the detecting means.

With this structure, the detecting means detects whether or not the predetermined number of lower significant bits among the input data are all at Hi level, and, if affirmative, the detecting means outputs a detection signal. And, then, in response to this detection signal from the detecting means, the signal outputting means supplies a carry signal to that generating means which is more significant than the highest bit of the predetermined number of lower significant bits by one bit. Thus, when a data is input, a carry signal is generated and propagated within the predetermined number of lower significant bits sequentially from the generating means of the lowest bit of the predetermined number of lower significant bits; on the other hand, after outputting of a carry signal to the generating means of a bit which is more significant than the predetermined number of lower bits by one bit by the detecting means and the signal outputting means, a carry signal is generated and propagated to the generating means of higher significant bits sequentially.

In accordance with another aspect of the present invention, the plurality of generating means are divided into a plurality of blocks with bits arranged in the order in each block, and each block includes a control circuit having detecting means for detecting whether or not a predetermined number of bits among the input data are all at Hi level and outputting a detection signal if all of these bits are at Hi level and signal outputting means for outputting a carry signal to that generating means which is more significant than the predetermined number of lower significant bits by one bit in response to the detection signal output from the detecting means, whereby the number of bits within one block of the more significant bits is equal to or less than the number of bits within one block of the less significant bits.

With this structure, the carry control circuit of each block may generate a carry signal and transfer it to a more significant bit. Thus, without waiting the generation of a carry signal output from the generating means of a less significant bit, the generating means of a more significant bit may output a carry signal. In addition, since it is so structured that the number of bits in each block is equal to or less than the number of bits within the block of said bit, a time period from the time when data has been input to the time when an incremented data is output may be approximately uniform. Thus, the process time of this incrementer circuit may be set to be equal to or less than that approximately uniform time period.

It is therefore a primary object of the present invention to obviate the disadvantages of the prior art as described above and to provide an improved incrementer circuit fast in operation.

Another object of the present invention is to provide a high-speed incrementer circuit capable of providing an incremented address data upon inputting of an address data in a short period of time as compared with the prior art.

A further object of the present invention is to provide an improved incrementer circuit capable of maintaining a process time at minimum even if the number of bits of an input data has increased.

A still further object of the present invention is to provide an improved incrementer circuit reliable in operation and simple in structure.

A still further object of the present invention is to provide an improved incrementer circuit suitable for use in a microprogram controller of a semiconductor device.

Other objects, advantages and novel features of the present invention will become apparent from the following detailed description of the invention when considered in conjunction with the accompanying drawings.

DESCRIPTION OF THE PREFERRED EMBODIMENTS

Figure 1:
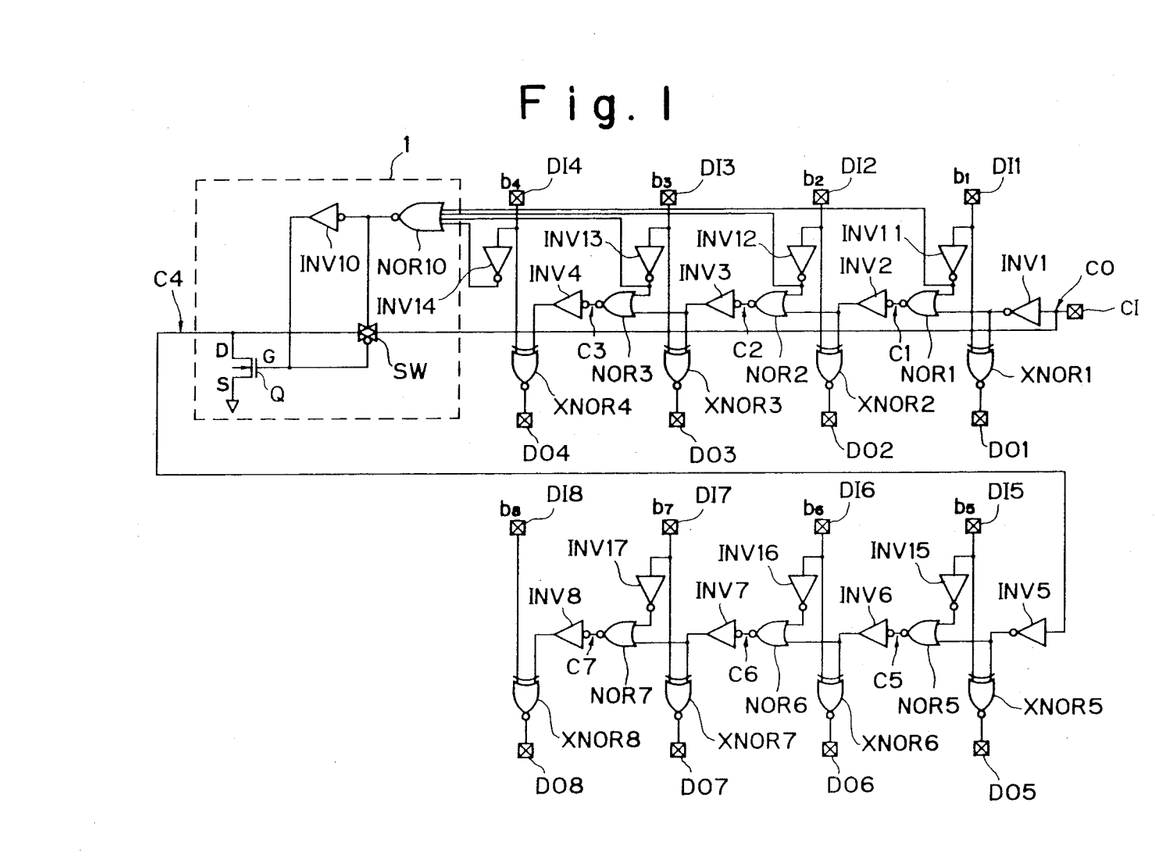
FIG. 1 is a schematic illustration showing an incrementer circuit constructed in accordance with one embodiment of a first aspect of the present invention.

Referring now to FIG. 1, there is shown an incrementer circuit constructed in accordance with one embodiment of the present invention and it is similar in structure to the prior art incrementer circuit shown in FIG. 1 so that like elements are indicated by like numerals. The present incrementer circuit shown in FIG. 1 differs from the prior art circuit of FIG. 2 in the provision of a carry control circuit 1 which is so structured to generate a Hi level carry signal C4 if all of lower or less significant bits b1 through b4 among an input address data are at Hi level.

As shown in FIG. 1, the carry control circuit 1 includes a NOR gate NOR10, an inverter INV10, a transmission gate SW, and an N-channel MOSFET Q as connected as shown. A carry in signal input into the input terminal CI is also applied to the drain D of the N-channel MOSFET Q via the transmission gate SW and also to the second input terminal of the NOR gate NOR5 as well as to the first input terminal of the exclusive NOR gate XNOR5 via the inverter INV5. On the other hand, inverted signals of bits b1 through b4 of the address data output from the inverters INV11 through INV14 are input into the first through fourth input terminals of the NOR gate NOR10, respectively. An output signal from the NOR gate NOR10 is applied to the gate of a P-channel transistor of the transmission gate SW and also to the gate of the N-channel MOSFET Q via an inverter INV10. The N-channel MOSFET Q has a source which is grounded.

With this structure, when a Hi level carry in signal is input into the input terminal CI, if an 8-bit address data having its four lower or less significant bits b1 through b4 being all at Hi level is input into the data input terminals DI1 through DI8, the NOR gate NOR10 supplies a Hi level signal to the gate of an N-channel transistor of the transmission gate SW and also to the gate of the P-channel transistor of the transmission gate SW and also to the gate of the N-channel MOSFET Q via the inverter INV10. Thus, the transmission gate is turned on and the N-channel MOSFET Q is turned off so that the Hi level carry in signal input into the input terminal CI is output as a carry signal C4 from the carry control circuit 1 via the transmission gate SW of the carry control circuit 1. The carry signal C4 is then input into the second input terminal of the NOR gate NOR5 and also to the first input terminal of the exclusive NOR gate XNOR5 via the inverter INV5. Thereafter, it operates in a manner similar to that of the previously described prior art, and, as a result, the input address data is incremented by "1" and output to the data output terminals DO1 through DO8.

On the other hand, in the case where a Hi level carry in signal is input into the input terminal CI, but not all of the four less significant bits b1 through b4 of a 8-bit address data input into the data input terminals DI0 through DI8 are at Hi level, the NOR gate NOR10 supplies a Lo level signal to the gate of the N-channel transistor of the transmission gate SW and also to the gate of the P-channel transistor of the transmission gate SW as well as to the gate of the N-channel MOSFET Q via the inverter INV10. As a result, the transmission gate SW is turned off and the N-channel MOSFET Q is turned on so that the carry control circuit 1 outputs a Lo level carry signal C4 which is then applied to the second input terminal of the NOR gate NOR5 and also to the first input terminal of the exclusive NOR gate XNOR5 via the inverter INV5. Thereafter, it operates in a manner similar to that of the previously described prior art, so that, as a result, the input address data is incremented by "1" and then output to the data output terminals DO1 through DO8.

Moreover, if a Lo level carry in signal is input into the input terminal CI, an 8-bit address data including bits b1 through b8 input into the data input terminals DI1 through DI8, respectively, is output to the data output terminals DO1 through DO8 as it is without change in a manner similar to the above-described prior art.

As described above, in accordance with this aspect of the present invention, provision is made of the carry control circuit 1 operatively coupled to a predetermined number of less significant bits, the four least significant bits b1 through b4 in the illustrated embodiment. Thus, when an address signal having eight bits is input, a carry signal C4 may be generated immediately without waiting carry signals C1 through C3 to be generated in sequence so that the time required for generating the carry signal C4 after inputting of an address data can be reduced significantly as compared with the prior art incrementer circuit of FIG. 2, according to which carry signals C1 through C3 are generated one after another in sequence before the carry signal C4 is generated. As a result, there is an advantage of significantly reducing the required time of the entire circuit from the time when an address data has been input to the time when an incremented address data is output. For example, in the worst case of all of the bits of an address data being at Hi level, the time required from inputting of an address data to outputting of an incremented address data in the incrementer circuit of the present invention is approximately half of that required by the typical prior art incrementer circuit.

In the above-described embodiment, the carry control circuit 1 for generating the fourth carry signal C4 in response to the four less significant bits of an input address data has been described. However, the present invention should not be limited only to this specific implementation and such a carry control circuit may receive any desired number of less significant bits, such as two, three or five bits. Alternatively, it may also be so structured that such a carry control circuit is provided for each predetermined number of bits. In addition, the above-described embodiment is an incrementer circuit for incrementing an 8-bit address data; however, the present invention should not be limited to an address data having a particular number of bits and the present invention should also be applied to any address data having any desired number of bits.

Figure 3:
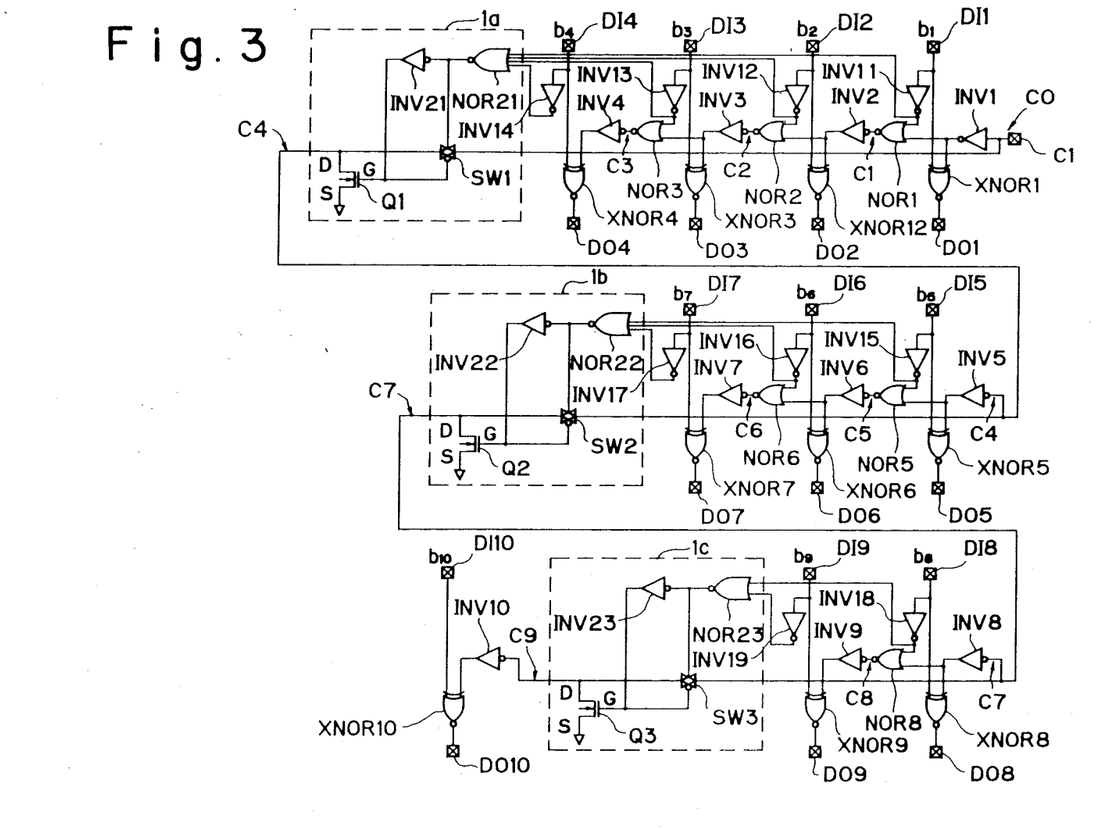
FIG. 3 is a schematic illustration showing an incrementer circuit constructed in accordance with one embodiment of a second aspect of the present invention.

Referring now to FIG. 3, there is schematically shown an incrementer circuit constructed in accordance with an embodiment of another aspect of the present invention. As shown in FIG. 3, the present incrementer circuit is similar in many respects to the previous embodiment shown in FIG. 1 excepting that the present embodiment has a structure to process a 10-bit address data instead of an 8-bit address data in the embodiment of FIG. 1. Thus, like elements are also indicated by like numerals.

Similarly with the incrementer circuit of FIG. 1, the present incrementer circuit also includes a carry control circuit 1a which generates a Hi level carry signal C4 when all of the lower or less significant bits b1 through b4 of an input address data are at Hi level. In addition to this carry control circuit 1a, the present incrementer circuit includes another carry control circuit 1b which generates a Hi level carry signal C7 when all of intermediate three bits b5 through b7 of the input address data are at Hi level. Furthermore, the present incrementer circuit includes a further carry control circuit 1c which generates a Hi level carry signal C9 when all of higher or more significant bits b8 and b9 of the input address data are at Hi level.

As shown in FIG. 3, the carry control circuit 1a includes a NOR gate NOR21, an inverter INV21, a transmission gate SW1, and an N-channel MOSFET Q1 which are connected as shown. The carry control circuit 1b includes a NOR gate NOR22, an inverter INV22, a transmission gate SW2 and an N-channel MOSFET Q2 which are connected as shown. The carry control circuit 1c includes a NOR gate NOR23, an inverter INV23, a transmission gate SW3 and an N-channel MOSFET Q3, which are connected a shown.

A carry in signal C0 input into the input terminal CI is applied to the drain of the N-channel MOSFET Q1 via the transmission gate SW1 and also to an input terminal of the transmission gate SW2 of the carry control circuit 1b as well as to the second input terminal of the NOR gate NOR5 and also to the first input terminal of the exclusive NOR gate XNOR5 via the inverter INV5. The inverted signals of the less significant bits b1 through b4 of an address data output via the inverters INV11 through INV14 are applied to respective first through fourth input terminals of the NOR gate NOR21, which supplies an output signal to an enable terminal of the transmission gate SW1, to a disable terminal of the transmission gate SW1 via the inverter INV21 and to the gate of the N-channel MOSFET Q1 whose source is grounded. The carry control circuits 1b and 1c are constructed similarly with the above-described carry control circuit 1a.

The transmission gate SW2 has an output terminal connected to an input terminal of an inverter INV8 and also to an input terminal of the transmission gate SW3 of the carry control circuit 1c, and the transmission gate SW3 has an output terminal connected to an input terminal of the inverter INV10. Inverted signals of bits b5 through b7 of the address data which are output from inverters INV15 through INV17 are input into respective first and third input terminals of the NOR gate NOR22, and inverted signals of bits b8 and b9 of the address data which are output from inverters INV18 and INV19 are input into respective first and second input terminals of the NOR gate NOR23.

In the present incrementer circuit constructed as described above, if a Hi level carry in signal C0 is input into the input terminal CI and the lower or less significant bits b1 through b4 among a 10-bit address data are all at Hi level, the NOR gate NOR21 of the carry control circuit 1a outputs a Hi level signal to an enable terminal of the transmission gate SW1 and also to a disable terminal of the transmission gate SW1 as well as to the gate of the N-channel MOSFET Q1 via the inverter INV21. Thus, the transmission gate SW1 is turned on and the N-channel MOSFET Q1 is turned off so that the Hi level carry in signal C0 input into the input terminal CI is output from the carry control circuit 1a as a carry signal C4 via the transmission gate SW1 of the carry control circuit 1a. The carry signal C4 is supplied to an input terminal of the transmission gate SW2 of the carry control circuit 1b and also to the second input terminal of the NOR gate NOR5 as well as to the first input terminal of the exclusive NOR gate XNOR5 via the inverter INV5. In addition, the carry control circuits 1b and 1c operate in a manner similar to that of the above-described carry control circuit 1a. The rest of the present incrementer circuit operates in a manner similar to the previously described prior art incrementer circuit. That is, the address data input into the data input terminals DI1 through DI10 is incremented by "1" and then output to the data output terminals DO1 through DO10.

If a Hi level carry in signal C0 is input into the input terminal CI under the condition that not all of the least significant bits b1 through b4 of a 10-bit address data input into the data input terminals DI1 through DI10 are at Hi level, the NOR gate NOR21 outputs a Lo level signal to an enable terminal of the transmission gate SW1 and also to a disable terminal of the transmission gate SW1 as well as to the gate of the N-channel MOSFET Q1 via the inverter INV21. Thus, the transmission gate SW1 is turned off and the N-channel MOSFET Q1 is turned on so that a Lo level carry signal C4 is supplied from the carry control circuit 1a to the input terminal of the transmission gate SW2 and also to the second input terminal of the NOR gate NOR5 as well as to the first input terminal of the exclusive NOR gate XNOR5 via the inverter INV5. The carry control circuits 1b and 1c operate in a manner similar to that of the carry control circuit 1a. Other than the above-described operation, the present incrementer circuit operates in a manner similar to that of the prior art incrementer circuit. Thus, the address data input into the data input terminals DI1 through DI10 is incremented by "1" and then output to the data output terminals DO1 through DO10.

If a Lo level carry in signal C0 is input into the input terminal CI, a 10-bit address data having bits b1 through b10 input into the respective data input terminals DI1 through DI10 is output to the data output terminals DO1 through DO10 without change in a manner similar to that of the prior art incrementer circuit.

As described above, the 10 bits are divided into three blocks, i.e., the first block including the first bit through the fourth bit, the second block including the fifth bit through the seventh bit and the third block including the eighth bit and the ninth bit. And, there are provided three carry control circuits 1a, 1b and 1c, one for each of the three blocks. And, when a 10-bit address data is input and a carry is produced at the most significant bit in the first block, the carry control circuit 1a generates the carry signal C4 without waiting for the sequential generation of the carry signals C1 through C3. Similarly, the carry signal C7 may be generated without waiting for the sequential generation of the carry signals C1 through C7, and the carry signal C9 may be generated without waiting for the sequential generation of the carry signals C1 through C8. Accordingly, as compared with the prior art, in which the carry signals C1 through C8 are generated in sequence, the time period for generating each of the carry signals C4, C7 and C9 after inputting of an address signal can be significantly reduced. Thus, there is an advantage of reducing a time period required by the entire circuit for incrementing an address data after receipt thereof. For example, in the worst case in which all of the bits of an input address data are at Hi level, the time required for outputting an incremented address data after receipt of an address data in the present incrementer circuit is approximately half of that required by the prior art incrementer circuit.

In the above-described embodiment, there are provided three carry control circuits 1a, 1b and 1c for generating the carry signal C4 for the fourth bit b4, the carry signal C7 for the seventh bit b7 and the carry signal C9 for the ninth bit b9, respectively. Thus, if the time period elapsing from the time when the carry in signal C0 is input into the input terminal CI to the time when the bit b4 of an incremented address data is output at the data output terminal DO4 after the carry in signal C0 travelling through the inverter INV1, NOR gate NOR1, inverter INV2, NOR gate NOR2, inverter INV3, NOR gate NOR3, inverter INV4 and exclusive NOR gate XNOR4 is designated as a first time period while designating the time period required for the carry in signal C0 to travel through the transmission gate SW1, inverter INV5, NOR gate NOR5, inverter INV6, NOR gate NOR6, inverter INV7 and exclusive NOR gate XNOR7 to output the bit b7 of the incremented address data at the data output DO7 as a second time period and the time required from the carry in signal C0 to travel through the transmission gate SW1, transmission gate SW2, inverter INV8, NOR gate NOR8, inverter INV9 and exclusive NOR gate XNOR9 to output the bit b9 of the incremented address data at the data output terminal DO9 as a third time period, then these three first, second and third time periods are substantially the same and the maximum time period required for obtaining an incremented address data after inputting of the carry in signal C0 is equal to one or each of these first through third time periods.

As described above, in the above-described embodiment, since the number of bits of an address data to be input into each of the carry control circuits 1a, 1b and 1c after inversion is reduced by one bit as the most significant bit of the address data is approached, the time period required at each block for obtaining an incremented address data after inputting of an address data and the carry in signal C0, i.e., the time period required for the carry in signal C0 to propagate to the most significant bit of each block after inputting thereof can be set within each of the first through third time periods. Thus, because of the provision of these three carry control circuits 1a, 1b and 1c, the time period required to obtain an incremented address data after inputting of the carry in signal C0 and an address data is minimized. THus, the process time of an incrementer circuit can be minimized by using a small number of carry control circuits 1a, 1b and 1c and also as compared with that of the prior art.

In general, in an incrementer circuit for incrementing an address data having a plurality of bits, if a plurality (J) of carry control circuits are to be provided, a first carry control circuit of the plurality (J) of carry control circuits is provided for a predetermined number (N) of bits and each of a second through Jth carry control circuits of the remaining carry control circuits is provided for a predetermined number (I) of bits which is defined by the following equation for K=2 to J.

$$I = \sum_{M=1}^{K}(N - M + 1) \qquad (1)$$

Here, I, N and M are integers. If J plurality of carry control circuits are provided according to the above equation (1), the time required for the carry in signal C0 to propagate through each of the blocks for J plurality of carry control circuits may be made substantially at constant, so that the process time of the incrementer circuit can be minimized by using a smaller number of carry control circuits. The integer N is a predetermined integer number which indicates the bit to which the first carry control circuit 1a is provided as viewed from the first bit or least significant bit of an address data, and the value of this integer N may be set depending on the process time of an incrementer circuit required.

Thus, in an incrementer circuit in which an address data having a plurality of bits is to be incremented, if a J plurality of carry control circuits are to be provided according to the above-described principle, the time period required to obtain an incremented address data after inputting of the carry in signal C0 and an address data to be incremented can be minimized by using a smaller number of carry control circuits. Accordingly, there can be provided a high-speed incrementer circuit which operates much faster than the prior art incrementer circuit.

Described more in detail, in order to minimize the time required to obtain an incremented address data after inputting of a carry in signal C0 and an address data to be incremented, it is only necessary to provide a J plurality of carry control circuits such that carry signals are produced by these carry control circuits at Nth bit, (N+(N−1))th bit, (N+(N−1)+(N−2))th bit, (N+(N−1)+(N−2)+(N−3))th bit, etc.

The above-described embodiment has been described regarding an incrementer circuit for incrementing a 10-bit address data. However, the present invention should not be limited only to such application and it may be applied for an incrementer circuit for incrementing an address data having any desired number of bits.

Figure 4:
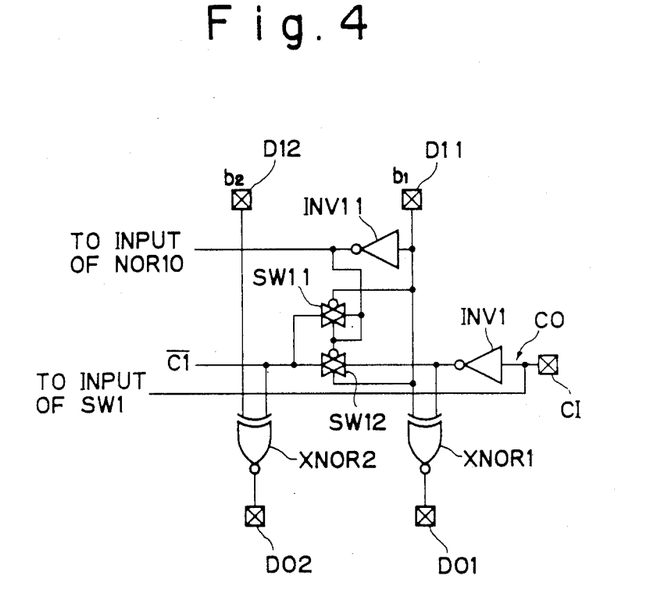
FIG. 4 is a schematic illustration showing another incrementer circuit which is a modification of the structure shown in FIG. 3.

FIG. 4 shows a circuit which is a modification of the incrementer circuit shown in FIG. 3. A shown in FIG. 4, the NOR gate NOR1 and the inverter INV2 may be replaced by a pair of transmission gates SW11 and SW12, and, similarly, each of the other combinations of NOR gate NOR2 and inverter INV3, of NOR gate NOR3 and inverter INV4, of NOR gate NOR5 and inverter INV6, of NOR gate NOR6 and inverter INV7, and of NOR gate NOR8 and inverter INV9 may also be replaced by a pair of transmission gates. In the structure shown in FIG. 4, an output terminal of the inverter INV11 is connected to an input terminal of the transmission gate SW11, to an enable terminal of the transmission gate SW11, and also to a disable terminal of the transmission gate SW12. The inverter INV1 has an output terminal which is connected to an input terminal of the transmission gate SW12. The data input terminal DI1 is connected to a disable terminal of the transmission gate SW11 and also to an enable terminal of the transmission gate SW12. Each of the transmission gates SW11 and SW12 has an output terminal which is connected to the first input terminal of the exclusive NOR gate XNOR2.

As described above, in accordance with this aspect of the present invention, since a plurality of generating means comprised, for example, of gate circuits are provided as divided in a predetermined number of blocks in an incrementer circuit and a carry control circuit is provided for each of these blocks to thereby generate a carry signal on a block-by-block basis to be transferred to a higher bit, the generating means at a higher or more significant bit can output a carry signal without waiting for the generation of a carry signal output from the generating means at lower or less significant bits. As a result, as compared with the prior art in which carry signals are generated on a bit-by-bit basis in sequence, the process time for outputting an incremented address data after inputting of an address data to be incremented can be minimized significantly. Besides, if the number of bits in each of the blocks is so set to become smaller toward the most significant bit of an address data, the time required for outputting an incremented address data after inputting an address data to be incremented can be maintained substantially at constant. By so doing, the process time of the present incrementer circuit can be set within this required time.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An incrementer circuit comprising:
   a plurality of first input terminals for receiving the bits of a first predetermined number of bits which range from a least significant bit to a most significant bit, said first predetermined number of bits including a second predetermined number of bits which exclude at least the most significant bit of said first predetermined number of bits;
   a second input terminal for receiving a carry in signal having either a high state or a low state;
   a plurality of output terminals each of which is coupled to a corresponding one of said plurality of first input terminals to receive a corresponding bit of binary data with or without inversion;
   carry signal generating means connected to said second input terminal and to the first input terminals which receive the bits of said second predetermined number of bits, said carry signal generating means including detecting means for detecting whether or not all of the bits of said second predetermined number of bits are at high level and supplying a detection signal when all of the bits of said second predetermined number of bits are, in fact, at high level and generating means for generating a carry signal to a bit which is more significant than the most significant bit of said second predetermined number of bits by one bit in response to said detection signal.

2. The circuit of claim 1, wherein said detecting means includes a NOR gate having a second predetermined number of input terminals each of which is connected to receive an inverted corresponding bit of said second predetermined number of less significant bits and an output terminal for outputting said detection signal.

3. An incrementer circuit comprising:
   a plurality of first input terminals for receiving the bits of a first predetermined number of bits, said plurality of first input terminals being divided into a plurality of blocks for receiving respective blocks of said first predetermined number of b its, the bits of said predetermined number of bits and of each block of bits ranging from a least significant bit to a most significant bit;
   a second input terminal for receiving a carry in signal having either a high state or low state;
   a plurality of output terminals each of which is coupled to a corresponding one of said plurality of first input terminals to receive a corresponding bit of binary data with or without inversion;
   carry signal generating means connected to said second input terminal, said carry signal generating means including a plurality of detecting means, each of said detecting means being associated with a corresponding one of said plurality of blocks for detecting whether or not all of the bits of the associated block are at high level and supplying a detection signal when all of said bits are, in fact, at high level and a plurality of generating means, each of which is operatively associated with a corresponding one of said plurality of detecting means for generating a carry signal to a bit which is more significant than the most significant bit of each block by one bit in response to said detection signal.

4. The circuit of claim 3, wherein each of said plurality of detecting means includes a NOR gate having a predetermined number of input terminals each of which is connected to receive an inverted corresponding one of said bits of a corresponding block and an output terminal for outputting said detection signal.

5. The circuit of claim 3, wherein the numbers of bits in said plurality of blocks decrease from the least significant bit toward a most significant bit of said first predetermined number of bits.

6. The circuit of claim 3, wherein each of the detecting means of said carry signal generating means is connected to the first input terminals which receive the bits of the block of bits associated with the respective detecting means.

* * * * *